US008386463B2

(12) United States Patent
Bestgen et al.

(10) Patent No.: US 8,386,463 B2
(45) Date of Patent: Feb. 26, 2013

(54) METHOD AND APPARATUS FOR DYNAMICALLY ASSOCIATING DIFFERENT QUERY EXECUTION STRATEGIES WITH SELECTIVE PORTIONS OF A DATABASE TABLE

(75) Inventors: Robert Joseph Bestgen, Dodge Center, MN (US); Shantan Kethireddy, Rochester, MN (US); Jeffrey Wayne Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 11/181,713

(22) Filed: Jul. 14, 2005

(65) Prior Publication Data

US 2007/0016558 A1    Jan. 18, 2007

(51) Int. Cl.
    *G06F 11/30* (2006.01)
(52) U.S. Cl. ........................ 707/713; 707/719
(58) Field of Classification Search .............. 707/3, 713, 707/719
    See application file for complete search history.

(56) References Cited

U.S. PATENT DOCUMENTS

| | | | |
|---|---|---|---|
| 5,404,510 A | 4/1995 | Smith et al. | |
| 5,590,319 A | 12/1996 | Cohen et al. | |
| 5,668,987 A | 9/1997 | Schneider | |
| 5,819,255 A | 10/1998 | Celis et al. | |
| 5,822,747 A | 10/1998 | Graefe et al. | |
| 5,924,094 A | 7/1999 | Sutter | |
| 5,974,457 A | 10/1999 | Waclawsky et al. | |
| 6,021,405 A | 2/2000 | Celis et al. | |
| 6,026,391 A | 2/2000 | Osborn et al. | |
| 6,032,143 A | 2/2000 | Leung et al. | |
| 6,092,062 A | 7/2000 | Lohman et al. | |
| 6,112,198 A | 8/2000 | Lohman et al. | |
| 6,223,171 B1* | 4/2001 | Chaudhuri et al. | 707/2 |
| 6,275,818 B1 | 8/2001 | Subramanian et al. | |
| 6,339,769 B1* | 1/2002 | Cochrane et al. | 707/2 |
| 6,470,335 B1 | 10/2002 | Marusak | |
| 6,564,212 B2 | 5/2003 | Koskas | |
| 6,567,802 B1 | 5/2003 | Popa et al. | |
| 6,581,055 B1* | 6/2003 | Ziauddin et al. | 707/4 |
| 6,609,123 B1 | 8/2003 | Cazemier et al. | |
| 6,618,719 B1 | 9/2003 | Andrei | |
| 6,643,640 B1 | 11/2003 | Getchius et al. | |

(Continued)

OTHER PUBLICATIONS

D. Chatziantoniou et al., "Groupwise Processing of Relational Queries", Proceedings of the 23$^{rd}$ VLDB Conference (1997).

(Continued)

*Primary Examiner* — Etienne Leroux
*Assistant Examiner* — Sabana Rahman
(74) *Attorney, Agent, or Firm* — Roy W. Truelson

(57) ABSTRACT

A query facility for database queries dynamically determines whether selective portions of a database table are likely to benefit from separate query execution strategies, and constructs an appropriate separate execution strategies accordingly. Preferably, the database contains at least one relatively large table comprising multiple partitions, each sharing the definitional structure of the table and containing a different respective discrete subset of the table records. The query facility compares metadata for different partitions to determine whether sufficiently large differences exist among the partitions, and in appropriate cases selects one or more partitions for separate execution strategies. Preferably, partitions are ranked for separate evaluation using a weighting formula which takes into account: (a) the number of indexes for the partition, (b) recency of change activity, and (c) the size of the partition.

16 Claims, 7 Drawing Sheets

U.S. PATENT DOCUMENTS

| | | | |
|---|---|---|---|
| 6,691,101 B2 | 2/2004 | MacNicol et al. | |
| 6,754,652 B2 * | 6/2004 | Bestgen et al. | 1/1 |
| 6,763,359 B2 | 7/2004 | Lohman et al. | |
| 6,785,673 B1 | 8/2004 | Fernandez et al. | |
| 6,789,071 B1 * | 9/2004 | Kapoor et al. | 1/1 |
| 6,816,874 B1 | 11/2004 | Cotner et al. | |
| 6,931,401 B2 | 8/2005 | Gibson et al. | |
| 6,957,225 B1 * | 10/2005 | Zait et al. | 1/1 |
| 7,020,661 B1 | 3/2006 | Cruanes et al. | |
| 7,076,508 B2 | 7/2006 | Bourbonnais et al. | |
| 7,111,020 B1 * | 9/2006 | Gupta et al. | 1/1 |
| 7,130,838 B2 | 10/2006 | Barsness et al. | |
| 7,139,749 B2 | 11/2006 | Bossman et al. | |
| 7,149,716 B2 | 12/2006 | Gatto | |
| 7,171,399 B2 | 1/2007 | Kapoor et al. | |
| 7,177,855 B2 | 2/2007 | Witkowski et al. | |
| 7,181,450 B2 | 2/2007 | Malloy et al. | |
| 7,366,716 B2 * | 4/2008 | Agrawal et al. | 1/1 |
| 7,395,537 B1 | 7/2008 | Brown et al. | |
| 2002/0035559 A1 | 3/2002 | Crowe et al. | |
| 2002/0049687 A1 | 4/2002 | Helsper et al. | |
| 2002/0103793 A1 | 8/2002 | Keller et al. | |
| 2003/0084030 A1 * | 5/2003 | Day et al. | 707/3 |
| 2004/0122845 A1 | 6/2004 | Lohman et al. | |
| 2004/0249810 A1 * | 12/2004 | Das et al. | 707/5 |
| 2004/0260684 A1 * | 12/2004 | Agrawal et al. | 707/3 |
| 2005/0038784 A1 * | 2/2005 | Zait et al. | 707/5 |
| 2005/0192937 A1 | 9/2005 | Barsness et al. | |
| 2005/0210010 A1 * | 9/2005 | Larson et al. | 707/3 |
| 2006/0080285 A1 | 4/2006 | Chowdhuri | |
| 2006/0101001 A1 | 5/2006 | Lindsay et al. | |
| 2006/0155679 A1 | 7/2006 | Kothuri et al. | |
| 2006/0173852 A1 | 8/2006 | Bestgen et al. | |
| 2006/0212429 A1 * | 9/2006 | Bruno et al. | 707/3 |
| 2006/0218123 A1 * | 9/2006 | Chowdhuri et al. | 707/2 |
| 2006/0271504 A1 | 11/2006 | Anderson et al. | |
| 2007/0016432 A1 | 1/2007 | Piggott et al. | |
| 2007/0061487 A1 | 3/2007 | Moore et al. | |
| 2007/0124276 A1 | 5/2007 | Weissman et al. | |
| 2007/0226176 A1 | 9/2007 | Bestgen et al. | |
| 2008/0033914 A1 | 2/2008 | Cherniack et al. | |

OTHER PUBLICATIONS

A. Shatdal et al., "Adaptive Parallel Aggregation Algorithms", Proceedings of the 1995 ACM-SIGMOD Conference (May 1995).

U.S. Appl. No. 11/138,832, entitled "Performance Data for Query Optimization of Database Partitions" filed May 26, 2005 by Mark J. Anderson et al.

"Using the Design Advisor to migrate from a single-partition to a multiple-partition database," http://publib.boulder.ibm.com/infocenter/db2help/topic/com.ibm.db2.udb.doc/admin/t0011.

U.S. Appl. No. 11/191,470 entitled "Method and Apparatus for Eliminating Partitions of a Database Table From a Join Query Using Implicit Limitations on a Partition Key Value" filed Jul. 28, 2005 by Robert Joseph Bestgen.

Stocker, et al. "Integrating Semi-Join-reducers into State-of-the-Art Query Processors", IEEE Computer Society, 2001.

R. Niemiec, "Oracle9i Introduces List Partitioning", (Oracle Magazine Jul./Aug. 2002).

"Getting to Know Oracle 8i", Chapter 2: Oracle8i New Features (Oracle Corp. 1999).

"Event 10128: debug partition elimination", published at www.oracleadvice.com/Tips/partprune.htm (publication date unknown).

U.S. Appl. No. 10/758,485, entitled "Look-Ahead Predicate Generation for Join Costing and Optimization," filed Jan. 14, 2004 by Abdo Abdo et al.

\* cited by examiner

METHOD AND APPARATUS FOR DYNAMICALLY ASSOCIATING DIFFERENT QUERY EXECUTION STRATEGIES WITH SELECTIVE PORTIONS OF A DATABASE TABLE

FIELD OF THE INVENTION

The present invention relates generally to digital data processing, and more particularly to the generation and execution of database queries in a digital computer system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises hardware in the form of one or more central processing units (CPU) for processing instructions, memory for storing instructions and other data, and other supporting hardware necessary to transfer information, communicate with the external world, and so forth. From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed at which a computer system performs day-to-day tasks (also called "throughput") can be increased by making various improvements to the computer's hardware design, which in one way or another increase the average number of simple operations performed per unit of time. The overall speed of the system can also be increased by making algorithmic improvements to the system design, and particularly, to the design of software executing on the system. Unlike most hardware improvements, many algorithmic improvements to software increase the throughput not by increasing the average number of operations executed per unit time, but by reducing the total number of operations which must be executed to perform a given task.

Complex systems may be used to support a variety of applications, but one common use is the maintenance of large databases, from which information may be obtained. Large databases usually support some form of database query for obtaining information which is extracted from selected database fields and records. Such queries can consume significant system resources, particularly processor resources, and the speed at which queries are performed can have a substantial influence on the overall system throughput.

Conceptually, a database may be viewed as one or more tables of information, each table having a large number of entries (analogous to rows of a table), each entry having multiple respective data fields (analogous to columns of the table). The function of a database query is to find all rows, for which the data in the columns of the row matches some set of parameters defined by the query. A query may be as simple as matching a single column field to a specified value, but is often far more complex, involving multiple field values and logical conditions. A query may also involve multiple tables (referred to as a "join" query), in which the query finds all sets of N rows, one row from each respective one of N tables joined by the query, where the data from the columns of the N rows matches some set of query parameters.

Execution of a query involves retrieving and examining records in the database according to some search strategy. For any given logical query, not all search strategies are equal. Various factors may affect the choice of optimum search strategy. One of the factors affecting choice of optimum search strategy is the sequential order in which multiple conditions joined by a logical operator, such as AND or OR, are evaluated. The sequential order of evaluation is significant because the first evaluated condition is evaluated with respect to all the entries in a database table, but a later evaluated condition need only be evaluated with respect to some subset of records which were not eliminated from the determination earlier. Therefore, as a general rule, it is desirable to evaluate those conditions which are most selective (i.e., eliminate the largest number of records from further consideration) first, and to evaluate conditions which are less selective later.

Other factors can also affect the choice of optimum execution strategy. For example, certain auxiliary database structures (sometimes called metadata) may, if appropriately used, provide shortcuts for evaluating a query. One well known type of auxiliary database structure is an index. An index is conceptually a sorting of entries in a database table according to the value of one or more corresponding fields (columns). For example, if the database table contains entries about people, one of the fields may contain a birthdate, and a corresponding index contains a sorting of the records by birthdate. If a query requests the records of all persons born before a particular date, the sorted index is used to find the responsive entries, without the need to examine each and every entry to determine whether there is a match. A well-designed database typically contains a respective index for each field having an ordered value which is likely to be used in queries. Other forms of auxiliary database record may also be used.

Some databases employ partitioned tables, which can be used to advantage in evaluating certain queries. Partitioning means that a larger conceptual database table is divided into multiple discrete portions ("partitions"), each entry in the table being allocated to a respective one of the partitions. A partition is usually a discrete data entity, such as a file, but contains the same definitional structure (i.e., number of fields in each entry, type of data in each respective field, etc.) as all other partitions of the same table. Partitioning may be performed for a variety of reasons, and is usually performed on very large tables as a means of breaking the data into subsets of some conveniently workable size. In many cases, records are allocated to partitions based on some key value. If the logical conditions of a query are such that it can be known that, for a given large table which is partitioned, all entries satisfying the query will be contained in some subset of the partitions, then it is not necessary to examine entries in the other partitions not in the subset, resulting in a considerable savings at query execution time.

To support database queries, large databases typically include a query engine which executes the queries according to some automatically selected search strategy, using the known characteristics of the database and other factors. Some large database applications further have query optimizers which construct search strategies, and save the query and its corresponding search strategy for reuse. These strategies may include, among other things, the order in which conditions are evaluated and whether an auxiliary data structure such as an index will be used. A query optimizer or similar function may generate a search strategy for a query based on certain assumptions about the use of auxiliary data structures or the number of entries eliminated from consideration by certain logical conditions. Where these assumptions are erroneous, the resultant query execution strategy may be significantly less than optimal.

Where a database table involved in a query is divided into multiple partitions, the query engine will separately examine the records in each applicable partition for satisfaction of the query conditions. As explained above, in some cases it may be inferred from the query conditions that no records within a particular partition or subset of partitions will satisfy the query, and in this case the query optimizer may construct the query to by-pass examination of these partitions. However, among the examined partitions (i.e., those which can not be eliminated from examination beforehand based on the known query and partition parameters), there may well be differences in data distribution, auxiliary structures or other characteristics which would affect the choice of optimal query execution strategy.

If a common query execution strategy is constructed for all partitions which can not be eliminated from consideration, this strategy will typically be based on average or common characteristics of the partitions. In this case, there is a risk that at least some partitions will have characteristics at variance with the average, and that the query execution strategy will be sub-optimal for these partitions.

In order to deal with different data characteristics of different partitions, it is known to separately analyze and construct an independent query execution strategy for each partition. However, construction of an appropriate query execution strategy involves considerable analytical overhead. The overhead of constructing a separate and independent query execution strategy for each respective partition can well outweigh the benefits of improved execution efficiency from tailoring the execution strategy to the partition. As the number of partitions of a database table grows, this overhead becomes increasingly burdensome.

A need exists for improved techniques for constructing query execution strategies against large, partitioned database tables. In particular, a need exists, not necessarily recognized, for an improved database query engine or optimizer which can automatically make intelligent choices in determining when to construct separate query execution strategies for different subsets of records a database.

SUMMARY OF THE INVENTION

A query engine (or optimizer) which supports database queries dynamically determines whether selective portions of a database table are likely to benefit from separate query execution strategies, and with respect to any selective portion determined likely to benefit from such a separate query execution strategy, constructs an appropriate strategy using characteristics of the selection portion.

In the preferred embodiment, a database contains at least one relatively large table which is partitioned into multiple partitions, each sharing the definitional structure of the table and containing a different respective discrete subset of the table records. If a query is generated against data in the table, a query engine or optimizer compares metadata for different partitions to determine whether sufficiently large differences exist among the partitions, and in appropriate cases selects one or more partitions for separate evaluation. A separate and independent query execution strategy is then constructed for each of the selected partitions, with a general strategy being constructed for the remaining partitions.

In the preferred embodiment, partitions are ranked for separate evaluation using a weighting formula which takes into account: (a) the number of indexes for the partition, (b) recency of change activity, and (c) the size of the partition, it being understood that numerous other factors could additionally or alternatively be taken into account. If the weighted score of one or more partitions exceeds a pre-determined threshold, then those partitions having the highest score and exceeding the threshold are selected, up to a pre-determined selection limit. It is possible that no partitions will be selected, or that a number of partitions fewer than the selection limit will be selected. A separate query strategy is then constructed for each selected partition, using the data characteristics of the partition.

A technique for selectively identifying partitions for independent query optimization as described herein can be implemented using very little overhead. By intelligently selecting only some partitions for separate query optimization, the overhead of optimizing every partition independently is avoided, and separate optimization is performed in those fewer but significant cases where it is likely to make a real difference in query execution performance. In those selective partitions, a separate query execution strategy, independently optimized using the characteristics of the partition, is likely to provide significant query execution performance improvements.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
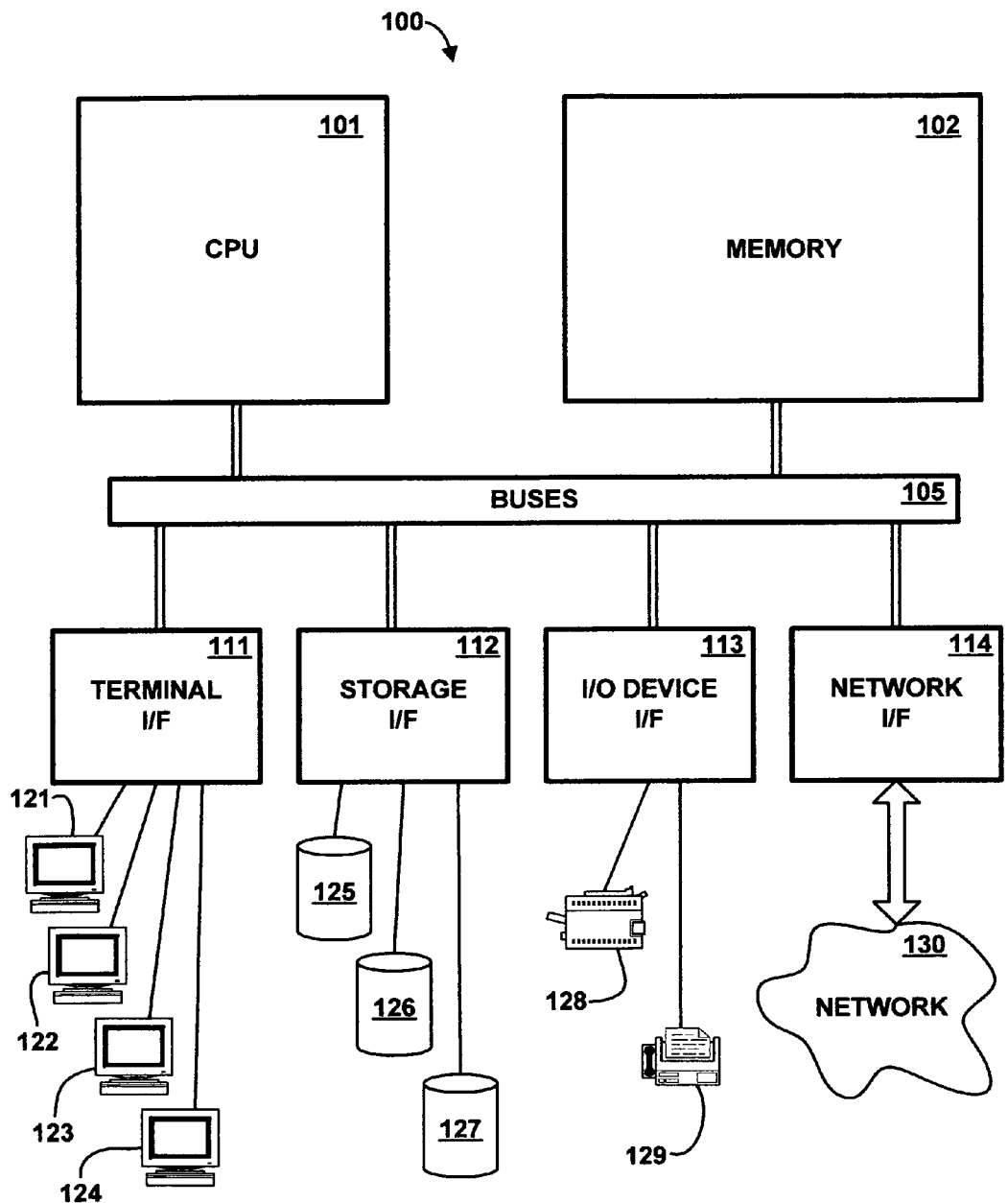
FIG. 1 is a high-level block diagram of the major hardware components of a computer system for executing database queries and dynamically associating different query execution strategies with different database portions, according to the preferred embodiment of the present invention.

Referring to the Drawing, wherein like numbers denote like parts throughout the several views, FIG. 1 is a high-level representation of the major hardware components of a computer system 100 for use in generating and executing database queries, dynamically determining whether different portions of a queried database are likely to benefit from different query execution strategies, and generating different strategies as required by the determination made, according to the preferred embodiment of the present invention. CPU 101 is at least one general-purpose programmable processor which executes instructions and processes data from main memory 102. Main memory 102 is preferably a random access memory using any of various memory technologies, in which data is loaded from storage or otherwise for processing by CPU 101.

One or more communications buses 105 provide a data communication path for transferring data among CPU 101, main memory 102 and various I/O interface units 111-114, which may also be known as I/O processors (IOPs) or I/O adapters (IOAs). The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 105 are shown in FIG. 1 as a single entity, in fact communications among various system components is typically accomplished through a complex hierarchy of buses, interfaces, and so forth, in which higher-speed paths are used for communications between CPU 101 and memory 102, and lower speed paths are used for communications with I/O interface units 111-114. Buses 105 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 105 from various communications paths running to the various I/O devices, it would alternatively be possible to connect some or all of the I/O devices directly to one or more system buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input, or a system such as a server containing no directly attached terminals. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
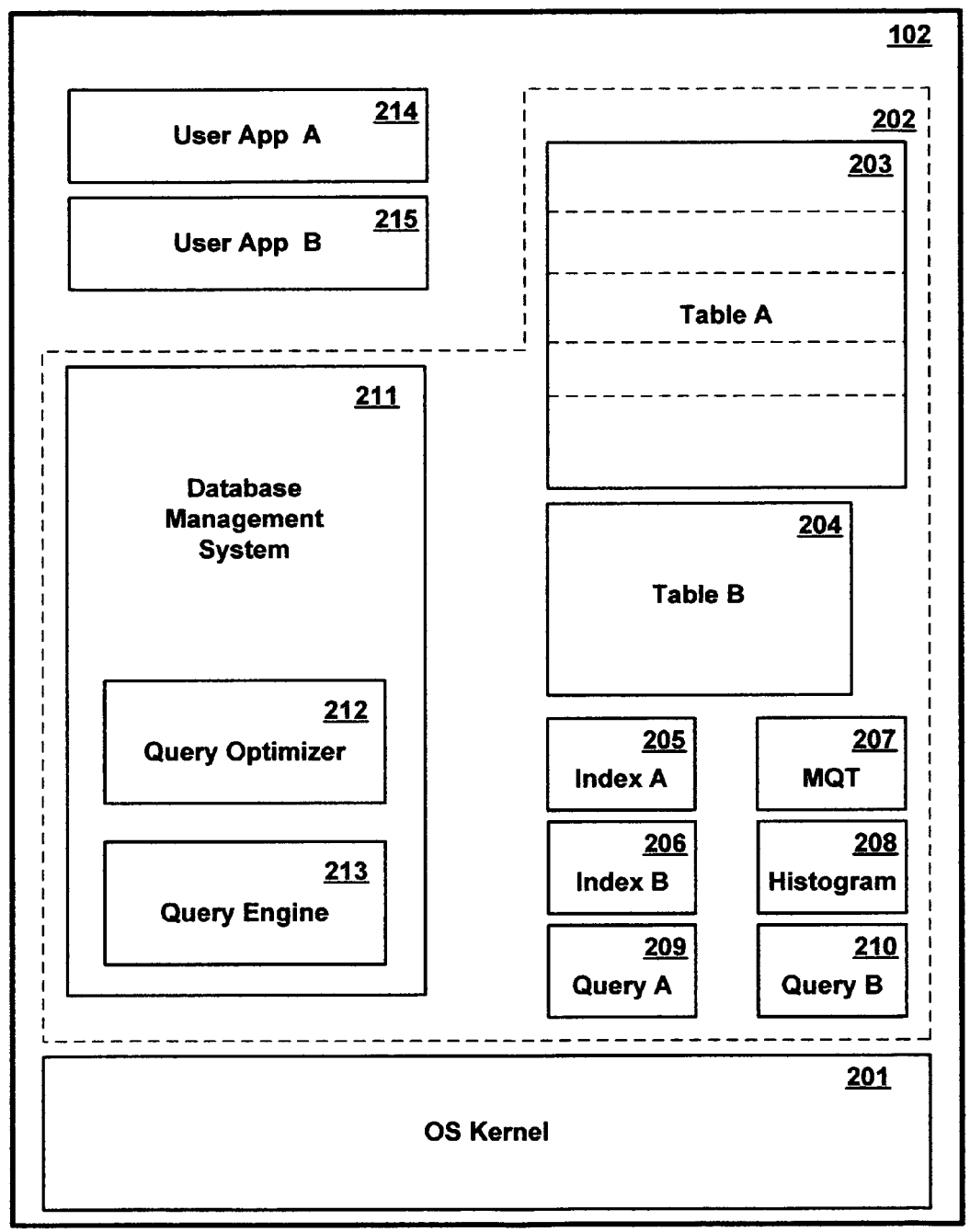
FIG. 2 is a conceptual illustration of the major software components of a computer system for executing database queries and dynamically associating different query execution strategies with different database portions, according to the preferred embodiment.

FIG. 2 is a conceptual illustration of the major software components of system 100 in memory 102. Operating system kernel 201 is executable code and state data providing various low-level software functions, such as device interfaces, management of memory pages, management and dispatching of multiple tasks, etc. as is well-known in the art. A structured database 202 contains data which is maintained by computer system 100 and for which the system provides access to one or more users, who may be directly attached to system 100 or may be remote clients who access system 100 through a network using a client/server access protocol.

Database 202 contains one or more tables 203, 204 (of which two are shown in FIG. 2), each having a plurality of entries or records, each entry containing at least one (and usually many) fields, as is well known in the art. Database tables 203, 204 might contain almost any type of data which is provided to users by a computer system. In accordance with the preferred embodiment, at least one database table (represented in FIG. 2 as table 203) comprises multiple partitions, each partition containing some discrete portion of the entries in table 203. Associated with the database tables are one or more auxiliary data structures 205-208, also sometimes referred to as metadata. Auxiliary data structures characterize the structure of the database and data therein, and are useful in various tasks involved in database management, particularly in executing queries against the database. Examples of auxiliary data structures include database indexes 205-206, materialized query table 207, and histogram 208, it being understood that other types of metadata may exist.

Database management system 211 provides basic functions for the management of database 202. Database management system 211 may theoretically support an arbitrary number of database tables, which may or may not have related information, although only two tables are shown in FIG. 2. Database management system 211 preferably allows users to perform basic database operations, such as defining a database, altering the definition of the database, creating, editing and removing records in the database, viewing records in the database, defining database indexes, and so forth. Among the functions supported by database management system 211 is the making of queries against data in database tables 203, 204. Query support functions in database management system 211 include query optimizer 212 and query engine 213. Database management system 211 may further contain any of various more advanced database functions. Although database management system 211 is represented in FIG. 2 as an entity separate from operating system kernel 201, it will be understood that in some computer architectures various database management functions are integrated with the operating system.

Query optimizer 212 generates query execution strategies for performing database queries. As is known in the database art, the amount of time or resource required to perform a complex query on a large database can vary greatly, depending on various factors, such as the availability of an index or other auxiliary data structure, the amount of resources required to evaluate each condition, and the expected selectivity (i.e., number of records eliminated from consideration) of the various logical conditions. Optimizer 212 determines an optimal execution strategy according to any optimizing algorithm, now known or hereafter developed, and generates an execution strategy, also known as an "access plan", according to the determination. The execution strategy is a defined series of steps for performing the query, and thus is, in effect, a computer program. The optimizer 212 which generates the execution strategy performs a function analogous to that of a compiler, although the execution strategy data is not necessarily executable-level code. It is, rather, a higher-level series of statements which are interpreted and executed by query engine 213.

A query can be saved as a persistent storage object in memory, and can be written to disk or other storage. Once created by optimizer 212, a query execution strategy can be saved with the query as part of the persistent storage object. For a given query, it is possible to generate and save one, or optionally multiple, optimized execution strategies. The query can be invoked, and a saved query strategy re-used (re-executed), many times.

FIG. 2 represents persistent storage objects Query A 209 and Query B 210. Query objects are described in further detail herein, with respect to FIG. 4. Although two query objects are represented for illustrative purposes in FIG. 2, it will be understood that the actual number of such entities may vary, that typically a large computer system contains a much larger number of query objects, that each query object may contain or be associated with zero, one, or more than one execution strategies. Although these are referred to herein as "query objects", the use of the term "object" is not meant to imply that database management system 211 or other components are necessarily programmed using so-called object-oriented programming techniques, or that the query object necessarily has the attributes of an object in an object-oriented programming environment, although it would be possible to implement them using object-oriented programming constructs.

Although one database 202 having two database tables 203, 204, two indexes 205-206, one MQT 207 and one histogram 208 are shown in FIG. 2, the number of such entities may vary, and could be much larger. The computer system may contain multiple databases, each database may contain multiple tables, and each database may have associated with it multiple indexes, MQTs, histograms, or other auxiliary data structures not illustrated. Alternatively, some entities represented in FIG. 2 might not be present in all databases; for example, some databases might not contain materialized query tables or the like. Additionally, database 202 may be logically part of a larger distributed database which is stored on multiple computer systems. Although database management system 211 is represented in FIG. 2 as part of database 202, the database management system, being executable code, is sometimes considered an entity separate from the "database", i.e., the data.

In addition to database management system 211, one or more user applications 214, 215 executing on CPU 101 may access data in database tables 203, 204 to perform tasks on behalf of one or more users. Such user applications may include, e.g., personnel records, accounting, code development and compilation, mail, calendaring, or any of thousands of user applications. Some of these applications may access database data in a read-only manner, while others have the ability to update data. There may be many different types of read or write database access tasks, each accessing different data or requesting different operations on the data. For example, one task may access data from a specific, known record, and optionally update it, while another task may invoke a query, in which all records in the database are matched to some specified search criteria, data from the matched records being returned, and optionally updated. Furthermore, data may be read from or written to database tables 203, 204 directly, or may require manipulation or combination with other data supplied by a user, obtained from another database, or some other source. Although two applications 214, 215 are shown for illustrative purposes in FIG. 2, the number of such applications may vary. Applications 214, 215 typically utilize function calls to database manager 211 to access data in database 202, and in particular, to execute queries to data in the database, although in some systems it may be possible to independently access data in database 202 directly from the application.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex database server environment, the number and complexity of such entities is typically much larger. Additionally, although software components 202-215 are depicted in FIG. 2 on a single computer system 100 for completeness of the representation, it is not necessarily true that all programs, functions and data will be present on a single computer system or will be performed on a single computer system. For example, user applications may be on a separate system from the database; a database may be distributed among multiple computer systems, so that queries against the database are transmitted to remote systems for resolution, and so forth.

While the software components of FIG. 2 are shown conceptually as residing in memory 102, it will be understood that in general the memory of a computer system will be too small to hold all programs and data simultaneously, and that information is typically stored in data storage devices 125-

127, comprising one or more mass storage devices such as rotating magnetic disk drives, and that the information is paged into memory by the operating system as required. In particular, database tables 203, 204 are typically much too large to be loaded into memory, and typically only a small portion of the total number of database records is loaded into memory at any one time. The full database 202 is typically recorded in disk storage 125-127. Furthermore, it will be understood that the conceptual representation of FIG. 2 is not meant to imply any particular memory organizational model, and that system 100 might employ a single address space virtual memory, or might employ multiple virtual address spaces which overlap.

Figure 3:
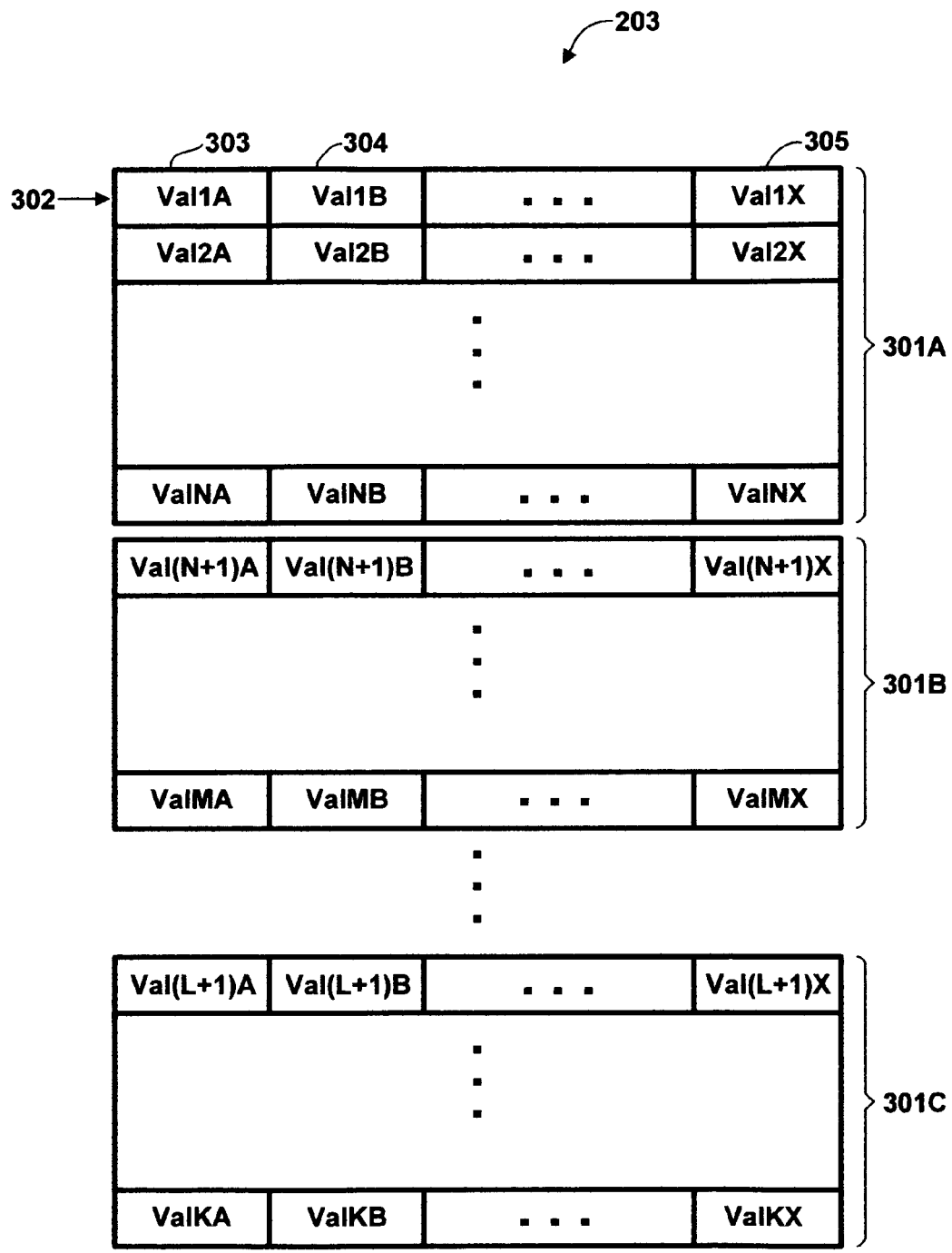
FIG. 3 is a conceptual representation of the structure of a partitioned database table, according to the preferred embodiment.

FIG. 3 is a conceptual representation of the structure of partitioned database table 203, according to the preferred embodiment. Database table 203 contains multiple database entries (also called records, or rows) 302, each entry containing multiple data values logically organized as multiple data fields 303-305. Database table 203 is conceptually represented in FIG. 3 as a table or array, in which the rows represent database entries or records, and the columns represent data fields. However, as is well known in the art, the actual structure of the database in memory typically varies due to the needs of memory organization, accommodating database updates, and so forth. A database table will often occupy non-contiguous blocks of memory; database records may vary in length; some fields might be present in only a subset of the database records; and individual entries may be non-contiguous. Portions of the data may even be present on other computer systems. Various pointers, arrays, and other structures (not shown) may be required to identify the locations of different data contained in the database.

Database table 203 is partitioned into multiple partitions 301A-301C (herein generically referred to as feature 301), of which three are shown in FIG. 3. A partition 301 contains a subset of the entries in the database table 203 of which it is a part. I.e., the partition is conceptually a table containing exactly the same data fields 303-305 as the database table 203 of which it is a part, but containing only some of the entries (rows) of the whole table. Each partition contains a discrete (i.e., non-overlapping) subset of the entries, the union of all the partitions 301 constituting the entire database table 203. Each partition 301 is itself a separate file, object or other data structure, although it is logically part of a larger table 203. Partitioned tables are often used because the volume of data in the whole table 203 is so large that including all of it in a single data structure violates some size constraint in the system, or simply becomes unwieldy to search or otherwise process, although a partitioned table may conceivably be used for other purposes. Although only three partitions are represented in FIG. 3 for clarity of illustration, it will be understood that the number of partitions could be (and often is) significantly larger.

Where table partitioning is used, there must be some consistent method for allocating each entry to a respective one of the partitions. This may be accomplished by using some hash function of an address or record number, which will generally allocate an approximately equal number of records to each partition. However, it is often advantageous to allocate entries to partitions according to the value of some data field controlling the partitioning, because if a query should include a condition referencing that field, it may be known in advance that all of the responsive entries will be in a particular one of the partitioned tables (or some subset of the partitioned tables), thus reducing the scope of the records which must be examined to satisfy the query. In this case, the partitioned tables will not generally be the same size, and there may be substantial size differences. This data field controlling the partitioning, also known as a "partition key", might contain an ordered value, where ranges of the ordered value correspond to respective partition tables, or might contain one of multiple discrete values, each discrete value corresponding to a respective partitioned table. For example, in a database table of transactions maintained by a bank or similar financial institution, it may be desirable to partition the table by ranges of dates, such as calendar year or month. Because many queries against the database will be limited to some particular range of dates, it is possible to immediately narrow the scope of records examined by removing from consideration any records contained in a partitioned table corresponding to a date range outside the scope of the query.

Figure 4:
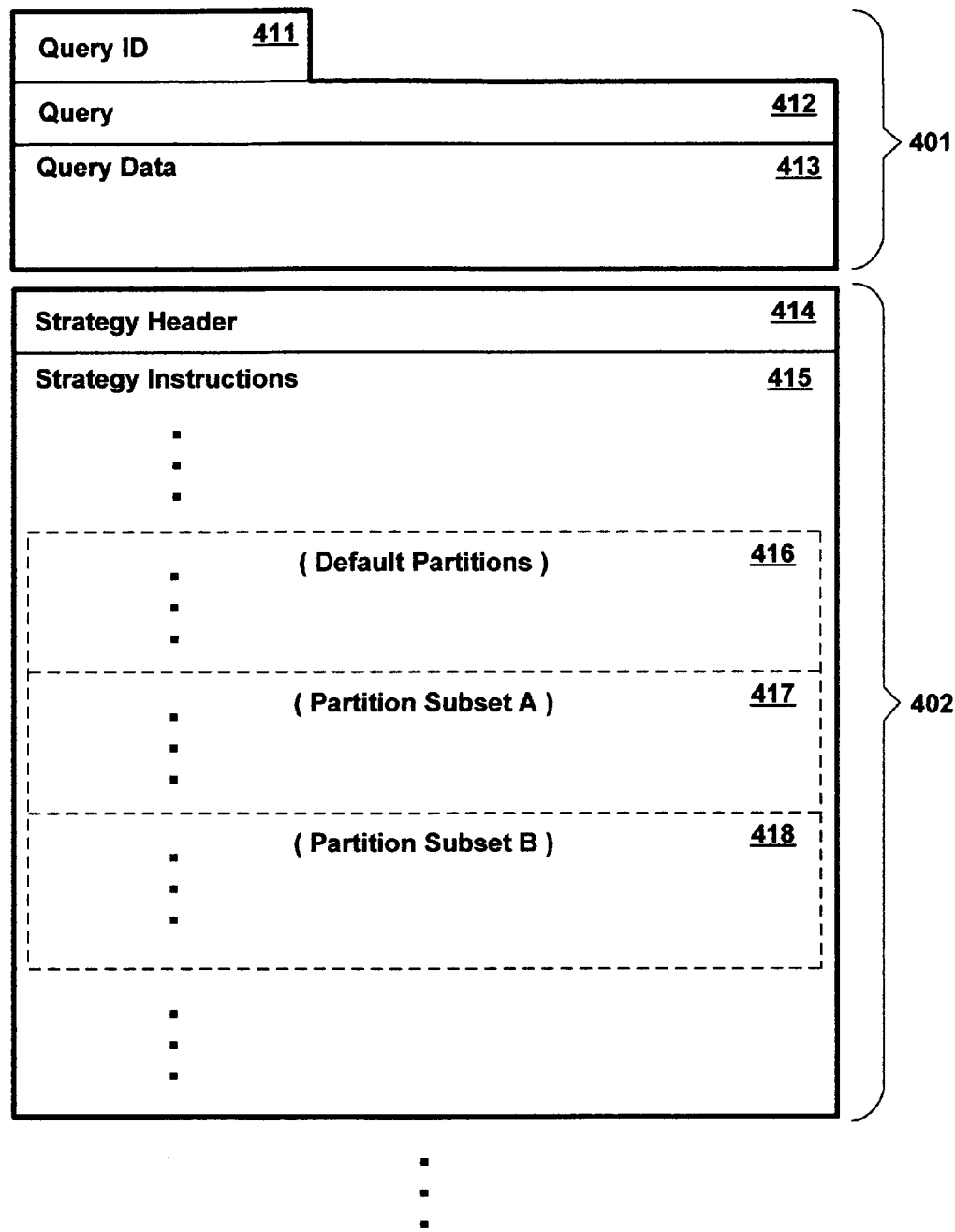
FIG. 4 is a conceptual representation of a persistent query object, according to the preferred embodiment.

FIG. 4 is a conceptual representation of a typical persistent query object 209, according to the preferred embodiment. A query object contains a body portion 401, and a variable number of execution strategy blocks 402, which could be zero, one or (optionally) multiple execution strategy blocks (of which one is represented in the example of FIG. 4). The body portion contains a query identifier field 411, a query logical representation 412, and additional query data 413. The query logical representation 412 is a representation of the query in a form understandable by the query optimizer 212 and/or query engine 213, from which a query execution strategy can be constructed. Additional query data 413 includes various other data which might be useful to database management system 211 or other applications accessing a query. For example, additional data 413 might include a text description of the query, performance statistics for running the query, security and access control information, and so forth. Additional query data 413 is represented in FIG. 4 as a single block of data for clarity of illustration; however, such additional data will typically comprise multiple fields, some of which may be optional or of variable length, or may reference data in other data structures.

Execution strategy block 402 contains data relating to a particular execution strategy for the query. In an optional implementation, there could be multiple execution strategies for a single query, each expressed in a corresponding execution strategy block. As is known in the art of database management, the choice of an optimal query execution strategy could depend in numerous factors, including the resources allocated to a particular user or process invoking a query, the values of imported variables within the query, the state of the system, and so forth. In some implementations, in may be possible to save multiple query execution strategies, each appropriate for use under a different respective set of conditions. In general, an execution strategy block contains a strategy header 414 and at least one set of strategy instructions.

The strategy header 414 will contain specific data relating to the use of the strategy and to distinguish it from other strategies, if multiple strategies exist. For example, a strategy header may contain a strategy identifier, a strategy condition expression (i.e. a logical expression specifying one or more conditions upon the use of the corresponding strategy), statistical data concerning prior uses of the strategy, and so forth. Header 414 is followed by a sequence of strategy instructions 415 for executing the corresponding strategy. In the preferred embodiment, these are not directly executable code, but are higher-level instructions which are interpreted by the query engine 213 to execute the query. These instructions determine whether or not indexes or other auxiliary data structures are used to search the database records and the order in which conditions are evaluated.

In accordance with the preferred embodiment, at least one strategy execution block (illustrated as block 402) contains strategy instructions 415 including multiple subsets of strategy instructions 416-418, each subset corresponding to a respective discrete subset of partitions in a partitioned table which is the subject of the query. Each subset 416-418 contains instructions such that, during execution, it is applied only to the subset of partitions to which it corresponds, i.e. it examines records only in the corresponding subset of partitions. This subset of partitions is referred to herein as the scope of the subset of strategy instructions. A first subset of strategy instructions is designated a default subset 416, which is applicable to all partitions which are not within the scope of any special subset. The default set is followed by a variable number of special subsets 417, 418 (of which two are illustrated in FIG. 4). Each special subset of strategy instructions is applicable to some specified subset of partitions only; in the preferred embodiment, each special subset is applicable to a single specific partition, although it would alternatively be possible to construct special subsets for multiple partitions. Strategy instructions 415 may include instructions in addition to those of the various subsets, e.g., to perform a union of the results produced by the subsets of strategy instructions, to execute join operations with records from other database tables which are subject to the query, etc.

Among the functions supported by database management system 211 is the making of queries against data in database 202, which are executed by query engine 213. As is known, queries typically take the form of statements having a defined format, which test records in the database to find matches to some set of logical conditions. Typically, multiple terms, each expressing a logical condition, are connected by logical conjunctives such as "AND" and "OR". Because database 202 may be very large, having a very large number of records, and a query may be quite complex, involving multiple logical conditions, it can take some time for a query to be executed against the database, i.e., for all the necessary records to be reviewed and to determine which records, if any, match the conditions of the query.

The amount of time required to perform a complex query on a large database can vary greatly, depending on many factors. Depending on how the data is organized and indexed, and the conditions of the query, conditions may optimally be evaluated in a particular order, and certain auxiliary data structures such as indexes or materialized query tables may be used. Of particular interest herein, it will be noted that different partitions of the same database table may exhibit different characteristics, which would affect the choice of optimal query. For example: data skew may cause the proportion of records selected by a query (or a sub-part of the query) to be much higher in one partition than another; one partition may be much larger than another; one or more auxiliary data structures (such as indexes) might encompass only a single partition or fewer than all partitions; some partitions might be more stable than others; etc. Where a single query strategy is chosen for all partitions of a partitioned table which is the subject of the query, it is possible that this strategy is sub-optimal for some of the partitions. However, to construct a separate strategy for each partitions entails substantial overhead, which often is not justified as the differences among partitions might be of no great consequence. These and other considerations should be taken into account in determining an optimum query execution strategy.

In accordance with the preferred embodiment, a query optimizer compares certain key parameters of the various partitions to determine whether there is likely to be a significant performance benefit in separately optimizing the query for one or more partitions, as explained in greater detail herein. If the comparison of key parameters indicates that a significant performance benefit is likely, separate query optimizations are performed for the partitions so identified. If the comparison of key parameters indicates that a significant performance benefit is unlikely, then a single query execution strategy is used for all partitions. Query strategies so constructed are preferably saved in a query object 209 for later re-use. The comparison of key parameters itself can be performed with very little overhead, so that the burden of constructing separate optimized query strategies for separate partitions of a table is limited to those queries in which it is likely to produce a significant benefit.

Figure 5:
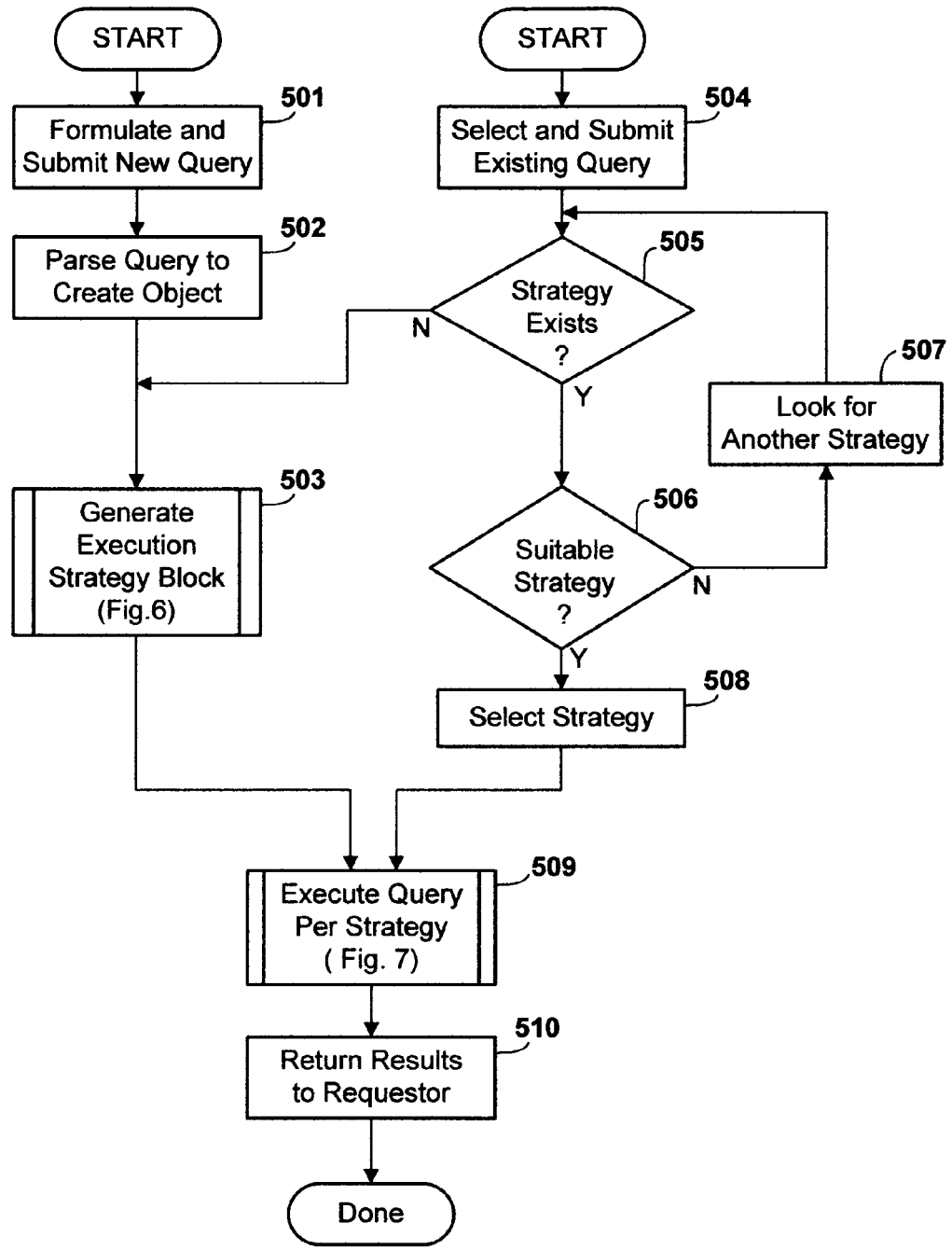
FIG. 5 is a flow diagram illustrating at a high level the process of executing a database query, according to the preferred embodiment.

FIG. 5 is a flow diagram illustrating at a high level the process of executing a database query, according to the preferred embodiment. Referring to FIG. 5, a query may be initiated either as a newly defined query, or as a re-used (previously executed and saved) query, as shown by the two paths beginning at blocks 501 and 504, respectively.

For a new query, a requesting user formulates and submits a database query using any of various techniques now known or hereafter developed (step 501). E.g., the database query might be constructed and submitted interactively using a query interface in database management system 211, might be submitted from a separate interactive query application program, or might be embedded in a user application and submitted by a call to the query engine 213 when the user application is executed. A query might be submitted from an application executing on system 100, or might be submitted from a remote application executing on a different computer system. In response to receiving the query, query engine 213 parses the query into logical conditions to generate a query object (step 502), which may be saved for re-use. The database management system invokes optimizer 212 to generate an optimized execution strategy block for the query. Generation of an optimized query execution strategy block is represented at a high level in FIG. 5 as step 503, and shown in greater detail in FIG. 6. Preferably, where the query is against data in a table which is partitioned into multiple partitions, the query optimizer dynamically decides whether to construct separately optimized strategies for different partitions, as described further herein with respect to FIG. 6. After generation of a suitable execution strategy at step 503, the database management system proceeds to step 509.

Where an existing query is re-used, a requesting user selects the existing query object for re-use and invokes it, using any of various techniques now known or hereafter developed (step 504). E.g., the query might be selected interactively from a menu in database management system 211, might be submitted from a separate interactive application program, or might be embedded in a user application and submitted by a call to the query engine 213 when the user application is executed, any of which might be performed from system 100, or from a remote system.

In response to invoking the query, query optimizer 212 determines whether a saved strategy exists in the query object 209 (step 505). If no such strategy exists (the 'N' branch from step 505), the query engine invokes the optimizer to generate one (step 503), as in the case of a new query. If a previously saved execution strategy exists for the query (the 'Y' branch from step 505), the database management system tests determines whether the saved strategy should be used for the current query (step 506). E.g., a strategy may have logical conditions associated with its use, or in some circumstances a strategy may be stale and should not be used as a result of changes to the database. If the saved execution strategy should not be used for any reason, then the 'N' branch is taken from step 506, and the database management system looks for another previously saved execution strategy (step 507), continuing then to step 505. The database management system continues to look for execution strategies (loop at steps 505-507) until a suitable strategy is found (the 'Y' branch from step 506) or there are no more strategies (the 'N' branch from step 505).

If a suitable pre-existing execution strategy is found, the 'Y' branch is taken from step 506, and an execution strategy is selected (step 508). Where multiple execution strategies are permissible, the database manager will choose one of these multiple strategies. Such a choice could be based on priorities, or any criteria or technique now known or hereafter developed, or could be arbitrary. After selecting a strategy, the database management system proceeds to step 509.

The query engine is then invoked to execute the query according to the query execution strategy which was either generated at step 503 or selected at step 508. Execution of a query execution strategy is represented at a high level in FIG. 5 as step 509, and shown in greater detail in FIG. 7. Generally, this means that the query engine retrieves selective database records according to the query execution strategy, and evaluates the logical query conditions with respect to the selected record in an order determined by the strategy, using any known technique or technique hereafter developed.

The query engine then generates and returns results in an appropriate form (step 510). E.g., where a user issues an interactive query, this typically means returning a list of matching database entries for display to the user. A query from an application program may perform some other function with respect to database entries matching a query.

Figure 6:
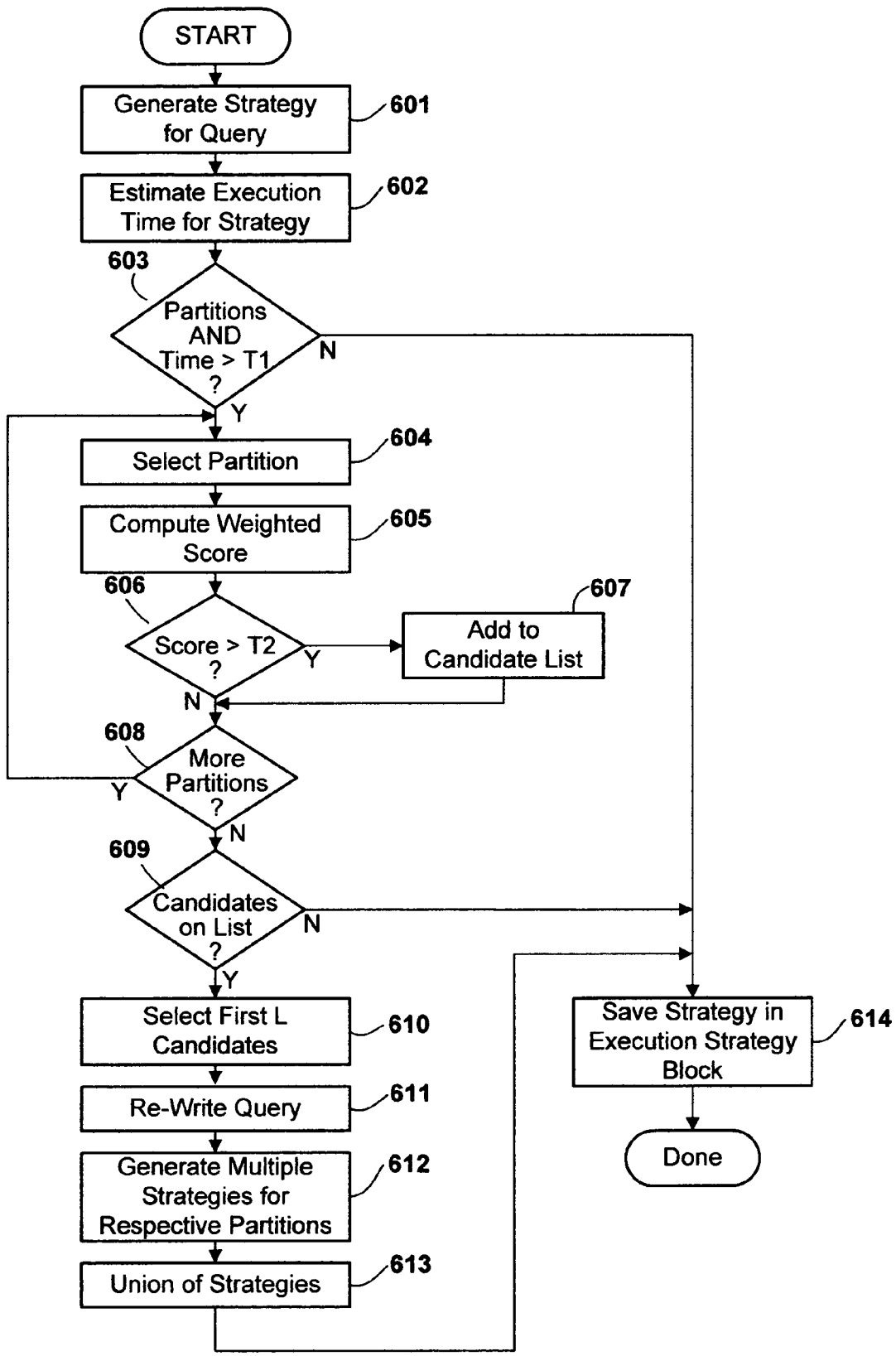
FIG. 6 shows in greater detail the process of generating a query execution strategy for a database table having multiple partitions, according to the preferred embodiment.

FIG. 6 shows in greater detail the process of generating a query execution strategy for a query involving a database table having multiple partitions, according to the preferred embodiment, represented in FIG. 5 as step 503. Referring to FIG. 6, the optimizer is invoked and generates an optimized query execution strategy for the original, unmodified query (step 601). The generation of query execution strategies is well-known in the art, and numerous techniques exist for optimizing a query execution strategy using known characteristics of the database, such as the size of database tables, available indexes and other metadata, probable number of responsive records, and so forth. Any query optimization technique, now known or hereafter developed, may be used for generating an optimized query execution strategy. If the query is against records in a database table having partitions and the query uses the partition key, then the optimizer might eliminate from its search any partitions which, by the terms of the query, can be safely eliminated because it is known in advance that no responsive records will be in those partitions. However, in all other respects the query execution strategy constructed at step 601 has a scope which includes all partitions of any partitioned database table, i.e., the same execution strategy is used for searching the records of each partition which is not entirely eliminated from consideration by the partition key.

After generating an execution strategy, the optimizer formulates an estimate of query execution time according to the execution strategy (step 602). Various estimation formulae are known in the art, and any appropriate formula, now know or hereafter developed, could be used.

If the database query involves a partitioned table and the estimated execution time exceeds some pre-established threshold T1, then the query is a suitable candidate for separate strategies for some partitions, and the 'Y' branch is taken from step 603. The purpose of the threshold T1 is to avoid attempts to construct separate query execution strategies for queries that will probably execute quickly anyway. In this case, the cost of constructing the separate execution strategy is likely to exceed any expected execution time saving from using separately optimized execution strategies for different partitions. The threshold T1 may be fixed, or may be variable depending on the expected frequency of execution of the query. E.g., if it is expected that a particular query will be frequently re-used, then increased cost in generating an optimized execution strategy may be justified, and in this case it may be desirable to directly or indirectly specify a lower threshold T1 than would be used for infrequently used, or one-time use, queries. If threshold T1 is not exceeded, or the database tables involved in the query are not partitioned, then the 'N' branch is taken from step 603 to step 614, and no further optimization is performed.

If the 'Y' branch is taken from step 603, the optimizer selects a next partition from the database table (step 604), and computes a weighted score for the selected partition (step 605). The weighted score is intended as a relative measure of how "different" the selected partition is from the other partitions in the same database table, for purposes of generating optimized query execution strategies. If a partition is sufficiently different from the other partitions in the same table in certain key respects, then it might benefit from a separately optimized execution strategy.

In the preferred embodiment, the weighted score is a sum of three weighting factors, based on the number of indexes for the partition, the recency of the latest change to the partition, and the size of the partition, i.e.:

$$W = F1(\#\text{indexes}) + F2(\text{change\_time}) + F3(\text{partition\_size}); \quad (1)$$

where F1, F2 and F3 are suitable functions.

The term F1(#indexes) is intended as an approximate indicator of the existence of a useful local index for the selected partition, which is not available for other partitions of the same table. An index is often constructed over an entire database table (i.e., all the partitions within a database table having partitions), but in some cases a "local index" will be constructed for the records of a single partition (or fewer than all partitions). The general query execution strategy constructed at step 601 will only use indexes which cover the entire table, but if a separate special query execution strategy is to be constructed for a selected partition and a local index exists for that partition, there is no reason why this special query execution strategy can not use the local index. The F1 function therefore computes the difference between the number of indexes available for the selected partition and some base number of indexes available to the partitions of the applicable table generally (the base number could be a minimum, an average, or similar measure). If the number of indexes for the selected partition exceeds the base number, there is possibly a local partition which might be useful in constructing a special query execution strategy for the selected partition. This difference might be multiplied by a suitable weighting coefficient, or subjected to some other operator to produce the F1 term of equation (1).

The term F2(change_time) is intended as an approximate measure of the volatility of the partition, i.e. the frequency of change activity. An unusually volatile partition might benefit from a special query execution strategy because the metadata available for the partition is likely to be less reliable. In the preferred embodiment, the F2 function compares the time elapsed from the most recent change to the selected partition with the average time elapsed from the most recent change to a partition in the database table. A very low elapsed time (in comparison to the average elapsed time) indicates a more volatile partition. Since elapsed time is a relative measure, it may be expressed in any of various relative terms, such as a deviation from a mean elapsed time, and is only relevant if it is a negative deviation (i.e., a shorter than average elapsed time, or some threshold below the average elapsed time). A negative deviation may be multiplied by a suitable (negative) weighting coefficient to produce the F2 term.

The term F3(partition_size) is intended as a relative measure of the partition size, i.e., its size with respect to other partitions in the same table. An unusually large partition might benefit from a special query execution strategy because searching it consumes a disproportionate amount of resource, so that any deviation from a typical data distribution or other characterizing parameter can have a magnified effect. In the preferred embodiment, the F2 function compares the size of the selected partition with the average partition size of partitions in the table. Size is preferably determined as a relative measure, e.g., a deviation from a mean size (or some threshold above a mean size), and is only relevant if it is a positive deviation. The deviation may be multiplied by a suitable weighting coefficient to produce the F3 term.

In the preferred embodiment, the weighting coefficients are assigned so that the F1 term is generally the most significant (if non-zero), followed in significance by the F2 and F3 terms. However, in any given case this is not necessarily true.

A database table can be partitioned according to the value of a key field (partition key) in which a discrete value or a range of values is assigned to each partition, but it may also be partitioned using a hashed value. For example, the least significant bits of a record number or similar data field can be used to allocate records to partitions. The advantage of hashing is that the hash function normally allocates records nearly equally among the various partitions, so all partitions are about the same size. The disadvantage is that there is no meaningful distinction of data among the various partitions, so it is unlikely that partitions can be eliminated from any particular query. If partitions are allocated using a hashed value, then the F2 term above is considered meaningless and is not used. Since hashed values normally produce partitions of approximately the same size, it is unlikely that the F3 term will produce a significant value, and therefore only the F1 term in equation (1) is likely to be significant.

It will be observed that the F1 and F2 terms as described above are somewhat rough measures of the intended indicia. In the case of the F1 term, a local index, even if it exists, may be unusable for purposes of evaluating the query, and a simple measure of the number of indexes is not necessarily proof of a useful local index. In the case of the F2 term, a very recent change to a partition may have been mere coincidence, and does not necessarily establish a high degree of volatility. These values are used as described because they provide a simple measure of the degree to which a partition is "different" from the others for purposes of using a special query execution strategy, which can be implemented by the optimizer with relatively little overhead. However, it would alternatively be possible to use more sophisticated measures of the intended indicia. It would further be possible to use alternative or additional indicia that a partition might benefit from a separate special query execution strategy, optimized for that partition alone. These indicia could be parameters associated with a particular partition or set of partitions, or with the database or system as a whole. Such alternative or additional indicia might include any or all of the following:

(a) The existence of significant data skew in a table, e.g., if it can be predicted that most of the responsive records will be contained in one or only a few partitions;

(b) The use of a range of partition key values in a query which encompasses all of one or more partitions, but only a portion of other partitions (which can be considered a special case of data skew); or (c) The total number of partitions is small.

Certain indicia have been described herein as a preferred method of identifying suitable partitions for special execution strategies, but the description of certain indicia is not meant to preclude the use of other indicia not described. Furthermore, although an algorithm using a "weighting formula" for ranking the partitions has been described, various alternative algorithms might be used which employ in various ways any of the indicia described herein, or other indicia, to select partitions or other portions of a database for special execution strategies.

If the weighted score according to equation (1) is greater than a pre-determined threshold T2, then the partition is a suitable candidate for a special query execution strategy. In this case the 'Y' branch is taken from step 606, and the partition is added to a list of possible candidates in a sorted order of weighted score (step 607). As in the case of threshold T1 used in step 603, threshold T2 could either be fixed, or could be a variable depending on the expected frequency of use of the query, T2 generally being lower if the query is to be used more frequently. If threshold T2 is not met, the 'N' branch from step 606 is taken, and step 607 is by-passed.

If any more partitions remain in the database table, the 'Y' branch is taken from step 608, and a next partition is selected for evaluation at step 604. When all partitions have been so evaluated, the 'N' branch is taken from step 608.

If the list of candidate partitions is non-empty (i.e., at least one partition's weighted score exceeded threshold T2), the 'Y' branch is taken from step 609. The optimizer then selects up to L partitions from the candidate list having the highest weighted scores for generating of respective special execution strategies (step 610). If there are fewer than L partitions in the candidate list, then all are selected, but in no case are more than L selected. The limit L is intended to prevent an excessive number of special execution strategies which might result from a large number of partitions and/or other factors. As in the case of thresholds T1 and T2, L might be fixed or variable. In the preferred embodiment, L is fixed at 4 partitions, it being understood that this number could vary, and that it would alternatively be possible to have no such limit L.

The optimizer then re-formulates the query as a union of queries against subsets of the database table (step 611). E.g., if partitions A, B and C are selected for special optimization in query Q, then query Q is re-formulated as four separate queries, comprising a general query QDefault which is query Q applied to all applicable partitions of the database table except partitions A, B and C, and special queries QA, QB and QC which are query Q applied to partitions A, B and C, respectively. The reformulated query Q is the union of queries QDefault, QA, QB and QC.

The optimizer then generates a query execution strategy for each of the separate queries, i.e., the default query and the special queries (step 612). Preferably, these query execution strategies are generated using the same techniques used in step 601, but using the characteristics of the corresponding partition(s) for which each query execution strategy is being generated (rather than the characteristics of the database table as a whole, as in the case of step 601). Because the characteristics of individual partitions may vary, the resultant query execution strategies may be different from that produced earlier at step 601. A complete query execution strategy is then generated by performing a union of the results generated by each of the separate query execution strategies (step 612).

The general query generated at step 601, or the separate queries generated at step 612 and joined by the union operation at step 613, as the case may be, are then saved in an execution strategy block 402 of the query object (step 614). This execution strategy block may additionally contain identifies, conditions or other data concerning use of the corresponding query execution strategy.

In the description above, it has been assumed for clarity of illustration that the query is against data in a single database table. As is well known in the database art, many queries involve "joins", in which data in multiple tables is examined. Where a join is involved, the process is essentially the same, but only applies to that portion of the query execution strategy instructions which examines a partitioned database table. I.e., if the query specifies a join of data in a partitioned database table with data in another table, the process illustrated in steps 603-613 and described above is used to replace, if necessary, the instructions which examine the partitioned database table, the remaining instructions (e.g., those which examine the other table and perform the join) being unaffected. It is further possible for a query to specify a join of multiple partitioned tables, in which case the process of steps 603-613 could be applied to each such table separately.

Figure 7:
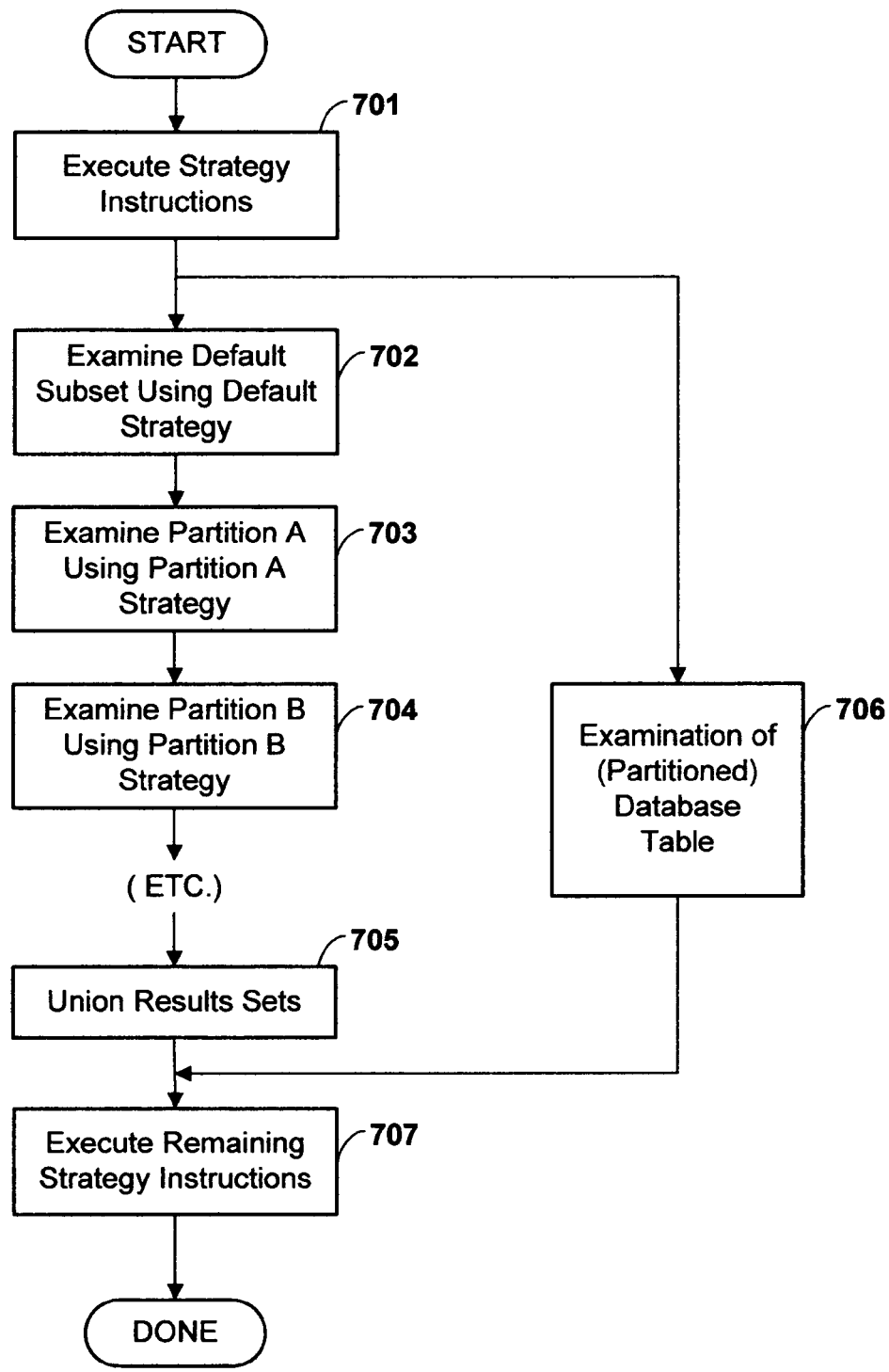
FIG. 7 shows in greater detail the process of executing a query using an execution strategy which is separately optimized for different partition of a database table, according to the preferred embodiment.

FIG. 7 shows in greater detail the process of executing a query using an execution strategy generated by query optimizer 212, according to the preferred embodiment, represented in FIG. 5 as step 510. This process is generally performed by query engine 213. Execution of a strategy amounts to executing the strategy instructions 415 contained in a strategy block 402.

Referring to FIG. 7, the query engine may (optionally) execute a preliminary series of instructions (step 701), and proceeds to a point where it will examine the records of a database table. At this point two divergent paths are illustrated in FIG. 7. A first path (through steps 702-705) represents an examination of records in a partitioned database table using multiple different execution strategies for different partitions. A second path (step 706) represents an examination of records in a database table (which may be a partitioned database table or a non-partitioned table) using a single strategy for all portions of the table.

Where multiple different query execution strategies were generated for a different partitions of a partitioned table (at step 503), the multiple strategies are executed by executing the query execution strategy instructions 416 for the default partitions (step 702), followed by query execution strategy instructions 417 for partition A (step 703), followed by query execution strategy instructions 418 for partition B (step 704), and so on for each of the special execution strategies. The union of the results sets generated by these multiple query execution strategies is then formed (step 705) as the results set for the partitioned database table as a whole.

Where a single query execution strategy was generated, the instructions of this strategy are executed to examine the table or all applicable partitions of the database table (step 706), thereby generating a result set.

The query engine then executes the remaining strategy instructions, if any (step 707). If only data from a single database table is subject to the query, then steps 701 and 707 might involve few or no instructions. However, where the query involves a join of data from multiple tables, then examination of one or more other tables might be performed in either step 701 or 707 or both.

Among the advantages of the technique described herein as a preferred embodiment is the relatively limited overhead. A decision can efficiently be made whether to construct separate execution strategies for separate partitions, and in those cases where it is determined not to construct such a strategy, very little resource has been devoted to making the decision. Where separate strategies are constructed, the optimizer will consume significant resources, but this will only be done where there is some indication that such strategies are likely to produce significantly improved execution. Furthermore, the technique described herein can be used in conjunction with, and does not foreclose the use of, other independent techniques for choosing or constructing an optimum query execution strategy.

In the preferred embodiment described above, the generation and execution of the query is described as a series of steps in a particular order. However, it will be recognized by those skilled in the art that the order of performing certain steps may vary, and that variations in addition to those specifically mentioned above exist in the way particular steps might be performed. In particular, the manner in which queries are written, parsed or compiled, and stored, may vary depending on the database environment and other factors. Furthermore, it may be possible to present the user with intermediate results during the evaluation phase.

In the preferred embodiment described above, individual partitions are evaluated as candidates for respective special query execution strategies, and determinations whether to construct special query execution strategies are made with respect to individual partitions. However, it would alternatively be possible to group discrete sets of partitions together for purposes of constructing special query execution strategies, or to construct special query execution strategies for discrete subsets of a database table other than partitions or sets of partitions.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network, including a wireless network. Examples of signal-bearing media are illustrated in FIG. 1 as system memory 102, and as data storage devices 125-127.

Although a specific embodiment of the invention has been disclosed along with certain alternatives, it will be recognized by those skilled in the art that additional variations in form and detail may be made within the scope of the following claims:

What is claimed is:

1. A method for executing a database query in a computer system, comprising the computer-executed steps of:

automatically selecting one or more candidate partitions of a partitioned database table for determining separate query execution strategies to be used for evaluating said database query, said partitioned database table having multiple previously defined partitions, each partition having a common definitional structure and comprising a respective disjoint subset of records of said partitioned database table, said candidate partitions comprising at least one and fewer than all previously defined partitions of said partitioned database table, said automatically selecting one or more candidate partitions step being performed without determining whether execution of said database query can benefit from using a separate query execution strategy for evaluating said database query against any said previously defined partition;

wherein said step of automatically selecting one or more candidate partitions of a partitioned database table comprises using at least one criterion from the set of criteria consisting of: (a) at least one parameter indicating the existence of at least one local index for a partition of said database table; (b) at least one parameter indicating volatility of a partition of said database table; and (c) at least one parameter indicating a relative size of a partition of said database table; and responsive to automatically selecting one or more candidate partitions of a partitioned database table, automatically generating a respective separate query execution strategy for evaluating said database query against each candidate partition of said candidate partitions of said partitioned database table, and automatically generating a union of a respective results set of each said separate query execution strategy, to execute more efficiently than a common query execution strategy for evaluating said database query against all partitions of said partitioned database table.

2. The method for executing a database query of claim 1, wherein said step of automatically selecting one or more candidate partitions of a partitioned database table comprises the computer-executed steps of:

automatically computing a respective weighted score for each of a plurality of said partitions, said weighted score being based on parameters of said database without reference to said database query; and comparing each said weighted score to a pre-determined threshold value.

3. The method for executing a database query of claim 2, wherein said step of automatically selecting one or more candidate partitions of a partitioned database table further comprises the computer-executed steps of:

if said weighted score for any said partition exceeds said pre-determined threshold value, then automatically ranking said discrete subsets having respective weighted scores in excess of said pre-determined threshold value according to their respective weighted scores; and selecting one or more said partitions as said candidate partitions according to rank established by said automatically ranking step.

4. The method for executing a database query of claim 1, further comprising the computer-executed steps of:

automatically constructing a common query execution strategy for evaluating said database query against all said partitions of said partitioned database table;

automatically estimating an execution time for said common query execution strategy; and automatically selecting candidate partitions only if the estimated execution time for said common query execution strategy exceeds a pre-determined threshold.

5. The method for executing a database query of claim 4, wherein said step of automatically generating a respective separate query execution strategy for evaluating said database query against each candidate partition of said candidate partitions of said partitioned database table further comprises computer-executed steps of:

automatically constructing a revised common query execution strategy for evaluating said database query against all said partitions of said partitioned database table for which no separate query execution strategy is constructed.

6. The method for executing a database query of claim 1, wherein said step of automatically selecting one or more candidate partitions of a partitioned database table comprises using at least one comparative criterion which compares a respective parameter of each said partition with a composite of said respective parameters derived from all of said partitions.

7. The method for executing a database query of claim 1, further comprising the computer-executed steps of:

automatically executing said multiple separate query execution strategies and said union of results sets; and saving said multiple separate query execution strategies and said union of results sets in a persistent query object for re-execution.

8. A computer program product for database query optimization comprising:

a plurality of computer-executable instructions recorded on non-transitory computer-readable media, wherein said instructions, when executed by at least one computer system, cause the at least one computer system to perform:

receiving a database query against information in a partitioned database table having multiple previously defined partitions, each said partition having a common definitional structure and comprising a respective disjoint subset of records of said partitioned database table;

selecting one or more candidate partitions of said partitioned database table for determining separate query execution strategies to be used for evaluating said database query, said one or more candidate partitions comprising at least one and fewer than all said previously defined partitions of said partitioned database table, said selecting one or more candidate partitions of said partitioned database table being performed without determining a hypothetical query execution strategy for separately evaluating said database query against any said previously defined partition;

wherein said selecting one or more candidate partitions of said partitioned database table comprises using at least one criterion from the set of criteria consisting of: (a) at least one parameter indicating the existence of at least one local index for a portion of said partitioned database table; (b) at least one parameter indicating volatility of a portion of said partitioned database table; and (c) at least one parameter indicating a relative size of a portion of said partitioned database table; and responsive to selecting one or more candidate partitions of said partitioned database table, generating a respective separate query execution strategy for evaluating said database query against each candidate partition of said candidate partitions of said partitioned database table, and automatically generating a union of a respective results set of each said separate query execution strategy, to execute more efficiently than a common query execution strategy for evaluating said database query against all partitions of said partitioned database table.

9. The computer program product of claim 8, wherein said selecting one or more candidate partitions of said partitioned database table comprises:
- computing a respective weighted score for each of a plurality of said partitions of said partitioned database table, said weighted score being based on parameters of said database without reference to said database query; and
- comparing each said weighted score to a pre-determined threshold value.

10. The computer program product of claim 9, wherein said selecting one or more candidate partitions of said partitioned database table further comprises:
- if said weighted score for any said partition exceeds said pre-determined threshold value, then ranking said partitions having respective weighted scores in excess of said pre-determined threshold value according to their respective weighted scores; and
- selecting one or more said partitions for generating respective separate query execution strategies according to rank established by said ranking step.

11. The computer program product of claim 8, wherein said selecting one or more candidate partitions of said partitioned database table comprises using at least one comparative criterion which compares a respective parameter of each said partition with a composite of said respective parameters derived from all of said partitions.

12. The computer program product of claim 8, wherein said instructions, when executed by said at least one computer system, cause the at least one computer system to perform:
- responsive to receiving said database query, constructing a common query execution strategy for evaluating said database query against all said partitions of said partitioned database table;
- estimating an execution time for said common query execution strategy; and
- performing said selecting one or more candidate partitions of said partitioned database table only if the estimated execution time for said common query execution strategy exceeds a pre-determined threshold.

13. The computer program product of claim 12, wherein said generating a respective separate query execution strategy for evaluating said database query against each candidate partition of said candidate partitions of said partitioned database table further comprises:
- constructing a revised common query execution strategy for evaluating said database query against all said partitions of said partitioned database table for which no separate query execution strategy is constructed.

14. A computer system, comprising:
- at least one processor;
- a data storage for storing a database, said database containing a partitioned database table having a plurality of partitions, each said partition having a common definitional structure and comprising a respective disjoint subset of records of said partitioned database table;
- a database management facility embodied as a plurality of instructions executable on said at least one processor, said database management facility including a query engine which executes logical queries against said database including logical queries against said partitioned database table and a query optimizer for generating execution strategies for executing logical queries against said database;
- wherein said database management facility automatically selects, with respect to each of a plurality of said logical queries against said partitioned database table, a respective one or more candidate partitions of said partitioned database table for determining separate query execution strategies to be used for evaluating the respective logical query, each said respective one or more candidate partitions comprising at least one and fewer than all partitions of said database table, each said respective one or more candidate partitions being selected without determining a hypothetical query execution strategy for separately evaluating the respective database query against any said partition;
- wherein said database management facility automatically selects a respective one or more candidate partitions by using at least one criterion from the set of criteria consisting of: (a) at least one parameter indicating the existence of at least one local index for a partition of said partitioned database table; (b) at least one parameter indicating volatility of a partition of said partitioned database table; and (c) at least one parameter indicating a relative size of a partition of said partitioned database table; and
- wherein, responsive to selecting a respective one or more candidate partitions of said partitioned database table, said database management facility automatically generates multiple separate query execution strategies for evaluating the respective logical query, each of said multiple separate query execution strategies being used for evaluating the respective logical query against a different respective disjoint non-empty set of partitions of said partitioned database table, and automatically generates a union of a respective results set of each said separate query execution strategy, to execute more efficiently than a common query execution strategy for evaluating said database query against all partitions of said partitioned database table.

15. The computer system of claim 14, wherein said database management facility automatically selects a respective one or more candidate partitions by computing a respective weighted score for each of a plurality of said partitions, each weighted scored being based on parameters of said database without reference to the respective logical query, and comparing each said weighted score to a pre-determined threshold value.

16. The computer system of claim 14, wherein said database management facility automatically selects a respective one or more candidate partitions by constructing a common query execution strategy for evaluating said database query against all said partitions of said partitioned database table, estimating an execution time for said common query execution strategy, and determining that multiple separate query execution strategies should be used only if the estimated execution time for said common query execution strategy exceeds a pre-determined threshold.

* * * * *